J. LINDALL.
SAFETY DEVICE FOR DRAWBRIDGES AND THE LIKE.
APPLICATION FILED DEC. 5, 1916.

1,303,077.

Patented May 6, 1919.
2 SHEETS—SHEET 1.

Inventor
John Lindall
by Jas. H. Churchill
atty.

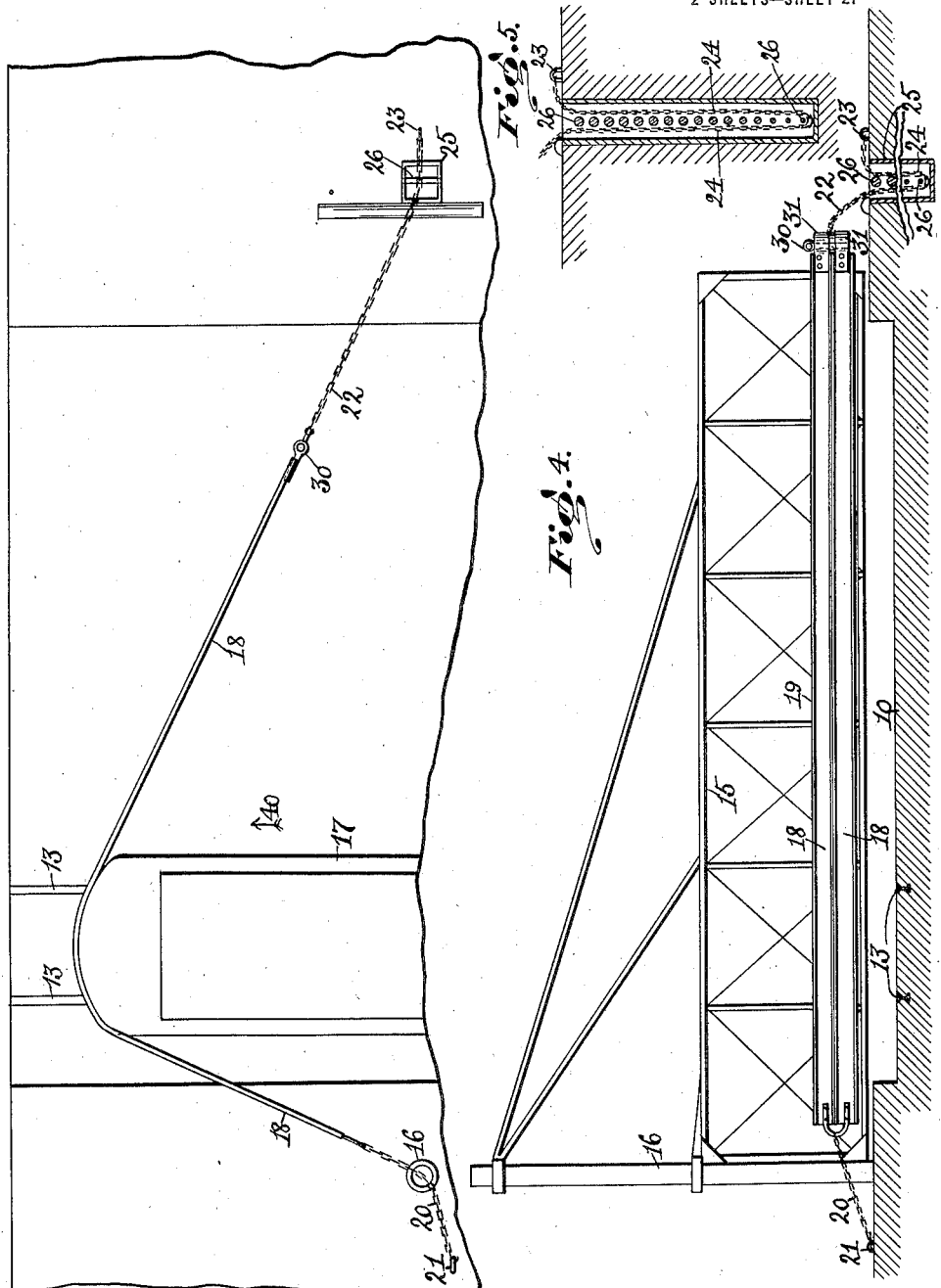
J. LINDALL.
SAFETY DEVICE FOR DRAWBRIDGES AND THE LIKE.
APPLICATION FILED DEC. 5, 1916.
1,303,077. Patented May 6, 1919.

UNITED STATES PATENT OFFICE.

JOHN LINDALL, OF BOSTON, MASSACHUSETTS.

SAFETY DEVICE FOR DRAWBRIDGES AND THE LIKE.

1,303,077.  Specification of Letters Patent.   Patented May 6, 1919.

Application filed December 5, 1916. Serial No. 135,235.

*To all whom it may concern:*

Be it known that I, JOHN LINDALL, a citizen of the United States, and a resident of Boston, in the county of Suffolk and State of Massachusetts, have invented an Improvement in Safety Devices for Drawbridges and the like, of which the following description, in connection with the accompanying drawings, is a specification, like characters on the drawings representing like parts.

This invention relates to a safety device for use with gates employed to stop vehicular traffic on roads and like ways, and is especially applicable for use with the gates now commonly employed on drawbridges. The invention has for its object to provide a simple and efficient safety device, which can be applied to the gate at a minimum expense and with which the traffic of motor vehicles and particularly high powered motor vehicles may be stopped when the gate is closed, thereby avoiding serious accidents when the draw of the bridge is open.

The invention has for its object to provide a safety device with which motor vehicles can be arrested without transferring the energy of the vehicle to the safety device, as will be described, whereby there is avoided serious damage or injury to persons riding on the vehicle and liability of accidents by reverse movement of the vehicle as might occur with a safety device capable of having energy transferred to it and possessing the same when the vehicle came to rest.

The invention further has for its object to provide a safety device of a wide range of usefulness and having provision for arresting vehicles of relatively small power, as well as vehicles of relatively large power, that is to say, the safety device is capable of stopping motor vehicles, such as commercial motor trucks, motor busses and the like, equally as well as motor vehicles, such as electric railway cars.

To this end, I have provided a barrier attached to the gate to move therewith, so that when the gate is closed the barrier is extended across the roadway, and said barrier is arranged on the gate at a sufficient height above the roadway to be struck by a solid portion of the vehicle, such for instance as the bumper in the case of an electric railway car.

The barrier is connected at one and if desired at both ends, with a chain, cable or like flexible device, which coöperates with a series of devices, such as bolts, metal pins and the like, which are spaced apart and are arranged to be successively engaged by the chain, cable or the like, as will be described.

The metal pins, bolts and the like constitute arresting devices, some of which are designed to break or yield one by one when excessive strain is placed upon them, and a sufficient number of said pins, bolts, etc., are used to insure stoppage of the motor vehicle before the latter can reach the open draw.

The arresting devices may and preferably will be graduated as to strength, for a purpose as will be described.

These and other features of this invention will be pointed out in the claims at the end of this specification.

Figure 1:
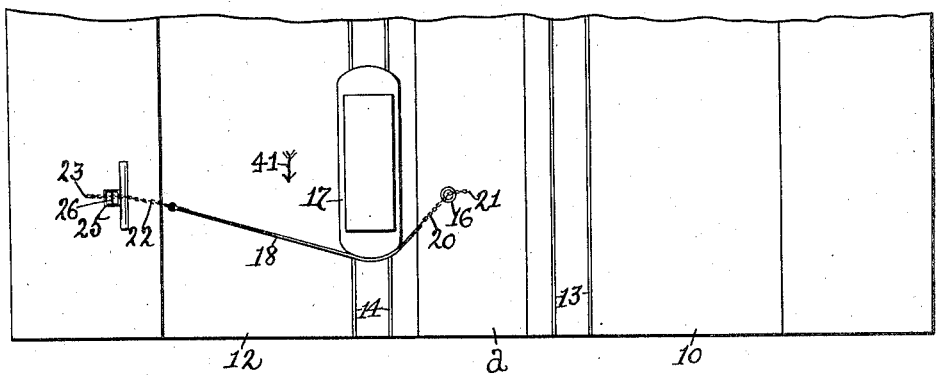
Figure 1 represents a sufficient portion of a bridge with the draw open and provided with safety devices embodying this invention, the latter being shown in operation.
Figure 1:
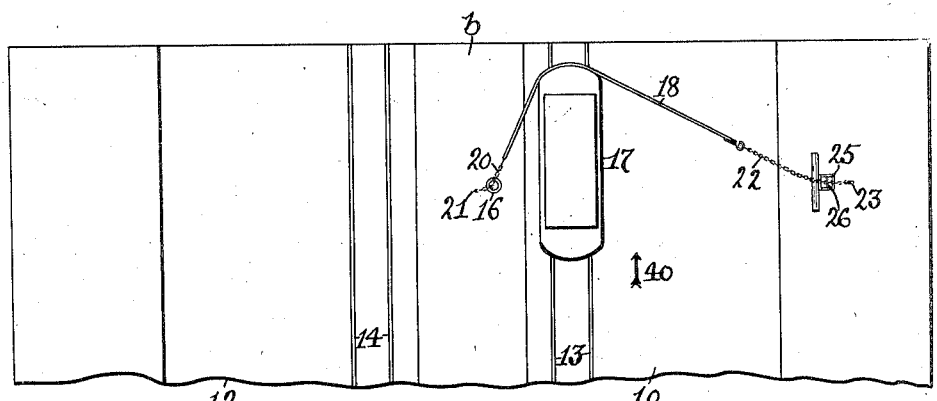

Fig. 3, an enlarged plan view of one portion of the bridge shown in Fig. 1.

Fig. 4, a cross section of the bridge and an elevation of the gate in its closed position, with the barrier in position to be operated, and Fig. 5, a detail of the well containing a loop of the chain and the series of pins, bolts or the like for arresting the car step by step.

Referring to the drawings, *a*, *b* represent the portions of a bridge on opposite sides of an opening *c*, which is normally closed by a draw, not shown. The bridge is represented as provided with roadways 10, 12, having two lines of track 13, 14, located on opposite sides of the longitudinal center of the bridge.

Each roadway 10, 12, is provided with suitable gates for closing the same to traffic when the draw is to be opened.

The gates referred to are and may be such as are now commonly employed, and in the present instance I have conventionally shown in Fig. 4, one form of gate 15, which is pivotally connected with an upright post 16 located at one side of the roadway 10, said gate being shown as a single gate which is of sufficient length to reach across the roadway.

In accordance with this invention, the gate 15 has secured to it a barrier, which extends lengthwise of the gate and across the roadway at a sufficient distance above the same to be engaged by a solid portion of a motor vehicle 17, which is herein represented as a street railway electric car.

Figure 2:
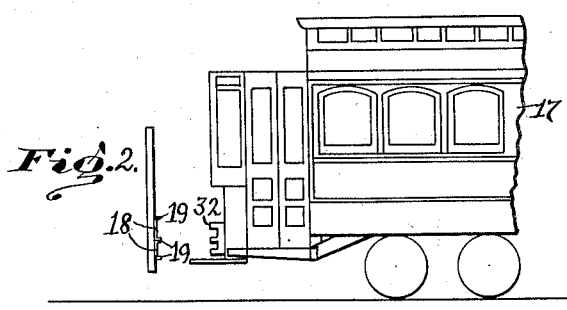
Fig. 2 is a side elevation of the front end of an electric surface railway car and a portion of a gate and barrier to illustrate the relation of the latter to the bumper of the car.

In the present instance, I have shown one form of barrier, namely, two channel irons or bars 18, which are made of sufficient length to extend across the roadway and are firmly secured to the gate 15 in any suitable manner with their sides or flanges 19 projecting outwardly (see Figs. 2 and 4).

The barrier 18 in the present instance is anchored at one end by a chain 20 or like means, to a fixed object, herein represented as a ring 21, which is firmly secured to the bridge or roadway, and the other end of said barrier has detachably secured to it a chain or like device 22, which has its other end suitably anchored as by a ring 23 or otherwise, and which is made of sufficient length to enable the chain to form a loop 24, which normally is located in a suitable well or receptacle 25, having it upper end substantially flush with the roadway. The well or receptacle 25 is provided within it with a vertical row of arresting devices, such as metal pins, bolts or the like devices 26, each of which is of sufficient size and strength to offer material resistance to movement of the barrier under the influences of the motor vehicle, and which are spaced apart so that when the strain of the chain 22 upon one bolt or pin is sufficient to break or otherwise dislodge it, the movement of the looped chain out of the well 25 will be arrested by the next adjacent pin until the latter is broken, and so on until the barrier ceases to move and the vehicle comes to rest.

The chain 26 may be detachably secured to the barrier 18 in any suitable manner, and in the present instance, it is shown as secured by a coupling pin 30, which passes down through eyes in metal straps 31 attached to the barrier and through a link of the chain 22 interposed between said straps, as indicated in Fig. 4.

The barrier 18 is secured to the gate at a suitable distance above the roadway to insure that it will be struck by a solid part of the electric or other motor vehicle 17, and in the present instance, said barrier is arranged to be struck by the bumper 32 (see Fig. 2) commonly used on electric railway cars, and said barrier is preferably made of channel bars, which are secured to the gate so as to present their sides or flanges 19 outwardly, so that the barrier serves to practically interlock with the bumper 32 and prevent the bumper and car from riding up over the barrier when the bumper strikes the latter.

The operation of the safety device may be briefly described as folows:—

When the draw is closed and the bridge is open to traffic, the chain 22 is detached from the barrier 18 and may be laid upon the ground or the bridge in proximity to the well 25, and the gate 15 with its barrier 18 is turned into a position parallel with the roadway, as now commonly practised.

When the draw is to be opened, the gate 15 is turned across the roadway to block the same, as now commonly practised, and the barrier is thus automatically extended across the roadway, as represented in Fig. 4. When the gate has been swung across the roadway, the operator couples the free end of the chain 22 with the barrier as by the pin 30, and the barrier is now placed in condition to stop the movement of a motor vehicle, which is herein shown as a car 17, traveling on the track 10 toward the draw opening c in the bridge. Assume that the car for any reason fails to stop and continues to travel toward the bridge at a fairly high speed. In this case, the bumper 32 will strike the barrier 18 and carry the same forward with the car. As the barrier is carried forward with the car, it places a very considerable strain upon the chain 22, which is resisted by the lowermost pin 26 in the well 25, and if the momentum of the car is such as to place sufficient strain upon the chain 22 to snap or break the lowermost pin or bolt 26, the chain 22 will be caught by the pin next above and so on until the car has been stopped.

The distance at which the car will be stopped will depend upon the strength of the bolts or pins 26, and in Fig. 1, I have represented two cars traveling in opposite directions, as indicated by the arrows 40, 41, which are shown as stopped at different distances from the draw opening c.

It may be preferred to make the barrier of metal bars, which will bend under the force of the blow, but it is not desired to limit the invention to this particular form of barrier, and so also it may be preferred to provide for stopping the car step by step, so that as soon as the vehicle is stopped, the barrier is relieved from strain, and practically no energy is stored up in the barrier and chain for moving the vehicle in a reverse direction, and as a result, serious injury to persons riding on the vehicle is avoided as well as accidents which might occur from a reverse movement of the vehicle after it has been stopped.

In the present instance, I have represented only one end of the barrier as attached to the looped chain 22, but if desired, both ends of said barrier may be connected to looped chains, and the pivotal connection of the gate with the post 16 may be such as to enable the gate and barrier to be carried forward bodily by the car until arrested by the looped chains and their coöperating pins.

It is preferred to graduate the strength of the pins 26, and in the present instance they are so shown, with the weakest pin at the bottom of the well and the strongest pin near the top, and with the intermediate pins of increasing diameter from the bottom to the top. As a result of this arrangement, provision is made for a step by step stopping of relative low-powered motor vehicles, such as commercial trucks, motor busses and the like, as well as the relatively higher-powered vehicles, such as electric railway cars.

In the present instance, I have illustrated one construction of safety device embodying the invention, but it is not desired to limit the invention to the particular construction shown.

So also I have herein represented the invention as employed in connection with a single gate, but it is equally well adapted for use on double gates, as in this case, the barrier can be secured to one gate and left free from the coöperating gate, or each gate can carry one half of the barrier and these halves can be coupled together when in operative position.

In the present instance, the barrier is made of such metal as will permit it to bend as represented in the drawing, and it is designed to be replaced by a straight barrier after being used once, but it is not desired to limit the invention to the use of bars attached to the gate, as the barrier may be one or more chains, cables or the like of the desired strength.

The gate to which the barrier is secured will be demolished when the barrier is struck by a car traveling at substantially high speed and moved into substantially the position illustrated in Fig. 3.

Claims:

1. The combination with a gate capable of being extended transversely of a road or way, of a barrier carried by said gate and arranged to be struck by a motor vehicle traveling on said road or way, a flexible device anchored at one end and connected at its other end with said barrier and of a sufficient length to form a loop, and arresting devices spaced apart and located within said loop to be engaged by said loop in succession until the barrier and vehicle come to rest.

2. The combination with a barrier extended transversely of a road or way, of a series of pins spaced apart, and a flexible device connected with said barrier and arranged with respect to said pins to successively engage the same by strain placed upon the flexible device by movement of said barrier.

In testimony whereof, I have signed my name to this specification.

JOHN LINDALL.